US008855045B2

(12) United States Patent
Zhou et al.

(10) Patent No.: US 8,855,045 B2
(45) Date of Patent: Oct. 7, 2014

(54) METHOD AND SYSTEM FOR CONTROLLING ESTABLISHMENT OF LOCAL IP ACCESS

(75) Inventors: Na Zhou, Shenzhen (CN); Jing Wang, Shenzhen (CN); Shuang Liang, Shenzhen (CN); Zaifeng Zong, Shenzhen (CN); Yingzhe Wu, San Diego, CA (US)

(73) Assignee: ZTE Corporation, Shenzhen, Guangdong Province (CN)

( * ) Notice: Subject to any disclaimer, the term of this patent is extended or adjusted under 35 U.S.C. 154(b) by 157 days.

(21) Appl. No.: 13/576,445

(22) PCT Filed: Jan. 26, 2011

(86) PCT No.: PCT/CN2011/070661
§ 371 (c)(1),
(2), (4) Date: Aug. 1, 2012

(87) PCT Pub. No.: WO2011/095100
PCT Pub. Date: Aug. 11, 2011

(65) Prior Publication Data
US 2012/0300638 A1 Nov. 29, 2012

(30) Foreign Application Priority Data
Feb. 8, 2010 (CN) .......................... 2010 1 0124699

(51) Int. Cl.
H04L 12/28 (2006.01)
H04L 12/56 (2006.01)
H04J 3/08 (2006.01)
H04W 4/00 (2009.01)
G06F 15/173 (2006.01)

(52) U.S. Cl.
USPC ............ 370/326; 370/331; 370/392; 709/238

(58) Field of Classification Search
USPC .......... 370/235–313, 329–356; 455/436–455; 709/206–221, 228–238
See application file for complete search history.

(56) References Cited

U.S. PATENT DOCUMENTS 7,940,769 B2 * 5/2011 Thubert et al. ................ 370/392
8,442,004 B2 * 5/2013 Bi et al. ........................ 370/331
(Continued)

FOREIGN PATENT DOCUMENTS

CN 101335715 A 12/2008
CN 101431780 A 5/2009
(Continued)

OTHER PUBLICATIONS

International Search Report for PCT/CN2011/070661 dated Apr. 10, 2011.

Primary Examiner — M. Phan
(74) Attorney, Agent, or Firm — Stephen Yang; Ling Wu; Ling and Yang Intellectual Property

(57) ABSTRACT

The present invention discloses a method for controlling establishment of a local IP connection, and the method includes: when an access gateway determines that data or application of a terminal needs to be offloaded, informing the terminal that a local IP connection needs to be established via a mobility management entity and a radio side network element by a bearer modification, or informing a radio side network element or a local gateway of a routing policy via a mobility management entity. The present invention also discloses a system for controlling establishment of a local IP connection. The present invention enables the terminal to instantly acquire whether a local IP connection needs to be re-established, can realize dynamic adjustment of local IP data; meanwhile, the present invention can realize dynamic adjustment of local IP data and dynamic establishment of the local IP connection in the case of the local IP connection.

18 Claims, 7 Drawing Sheets

(56) References Cited

U.S. PATENT DOCUMENTS

| | | | |
|---|---|---|---|
| 8,605,679 B2* | 12/2013 | Zhu et al. | 370/331 |
| 2010/0157944 A1* | 6/2010 | Horn | 370/331 |
| 2010/0284299 A1* | 11/2010 | Bi et al. | 370/253 |
| 2011/0116469 A1* | 5/2011 | Bi et al. | 370/331 |
| 2011/0225319 A1* | 9/2011 | Aso et al. | 709/238 |
| 2012/0170495 A1* | 7/2012 | Zhou et al. | 370/310 |
| 2012/0224536 A1* | 9/2012 | Hahn et al. | 370/328 |
| 2012/0278416 A1* | 11/2012 | Hurtta | 709/206 |

FOREIGN PATENT DOCUMENTS

| | | |
|---|---|---|
| CN | 101562854 A | 10/2009 |
| WO | 2009079842 A1 | 7/2009 |

* cited by examiner

METHOD AND SYSTEM FOR CONTROLLING ESTABLISHMENT OF LOCAL IP ACCESS

TECHNICAL FIELD

The present invention relates to the field of mobile communications, and more particularly, to a method and system for controlling establishment of a local IP connection.

BACKGROUND OF THE RELATED ART

An Evolved Packet System (abbreviated as EPS) of the 3rd Generation Partnership Project (abbreviated as 3GPP) consists of an Evolved Universal Terrestrial Radio Access Network (abbreviated as E-UTRAN), a Mobility Management Entity (abbreviated as MME), a Serving gateway (abbreviated as S-GW), a Packet Data Network Gateway (abbreviated as P-GW or PDN GW), a Home Subscriber Server (abbreviated as HSS), an Authentication, Authorization and Accounting (abbreviated as AAA) server of 3GPP, a Policy and Charging Rules Function (abbreviated as PCRF) entity and other support nodes.

FIG. 1 is a schematic diagram of an EPS system architecture in the related art, wherein:

the mobility management entity is responsible for related works related to a control plane such as mobility management, processing for non access stratum signalings, management of user mobility management context, and so on; the Services Gateway (S-GW) is an access gateway device connected with the E-UTRAN and forwards data between the E-UTRAN and the packet data network gateway (P-GW), and is responsible for buffering downlink packet when the UE is in idle; the packet data network gateway (P-GW) is a border gateway of the EPS and the Packet Data Network (abbreviated as PDN), and is responsible for the access of the PDN as well as functions such as forwarding data between the EPS and the PDN, and so on; both the S-GW and the P-GW belong to the core network gateway.

A Home (e)NodeB is a small, low-power base station deployed in indoor places such as homes, offices, and so on, it plays a main role in providing users with higher traffic rate and reducing costs for using high-speed services, and meanwhile, in making up the lack of coverage of existing offloaded cellular mobile communication systems. The advantages of the Home (e)NodeB are affordable, convenient, low-power output and plug and play, and so on. In the Home (e)NodeB system, the Home (e)NodeB is a radio side network element. The Home (e)NodeB can be directly connected to the core network, as shown in FIG. 1; it can also access the core network via a logical network element, i.e., the Home (e)NodeB gateway, as shown in FIG. 2, wherein, the main functions of the Home (e)NodeB gateway is: verifying the security of the Home (e)NodeB, handling the registration of the Home (e)NodeB, performing operation maintenance and administration on the Home (e)NodeB, configuring and controlling the Home (e)NodeB according to operator requirements, and being responsible for exchanging the data of the core network and that of the Home (e)NodeB.

Besides supporting the access of the mobile core network, the mobile communication system (comprising the Home (e)NodeB system) might also support a local IP access function; and in the conditions that the radio side network element has the local IP access capability and the user subscription allows the local IP access, it can be implemented that the terminal locally accesses to other IP devices in the home network or the Internet.

The implementation of the local IP access can adopt a variety of connection establishment modes: the functions of the core network access and the local IP access can be realized at the same time by establishing a connection (as shown in FIG. 1 and FIG. 2), at the time, there is no need to add the function of local gateway to the radio side network element or the Home (e)NodeB gateway; or a local gateway can also be added to provide strong support for the local IP access technology. The local gateway, as the gateway of accessing an external network (such as Internet) from the local, provides functions, such as address allocation, charging, packet filtering, policy control, traffic offload function, Non Access Stratum (abbreviated as NAS)/S1 Application Part (abbreviated as S1-AP)/Radio Access Network Application Part (abbreviated as RANAP)/General Tunneling Protocol (abbreviated as GTP)/Proxy Mobile IP (abbreviated as PMIP)/Mobile IP (MIP) message parsing, Network Address Translation (abbreviated as NAT), and local IP access strategy routing and enforcement, and so on.

The local gateway can be configured jointly with the radio side network element (as shown in FIG. 3 and FIG. 4). In the case that there is a Home (e)NodeB gateway, the local gateway not only can be configured jointly with the Home (e)NodeB, but also can be configured jointly with the Home (e)NodeB gateway (as shown in FIG. 5). The local gateway can be a Local SGW (abbreviated as L-SGW) and a local PGW (abbreviated as L-PGW), or can be an separate L-PGW. In addition, the Home (e)NodeB gateway can be configured jointly with the Home (e)NodeB.

For the Universal Terrestrial Radio Access Network (abbreviated as UTRAN) system, the core network gateway can be a Serving GPRS Support Node (abbreviated as SGSN), or a Gateway GPRS Support Node (abbreviated as GGSN). The local gateway can be a Local GGSN (abbreviated as L-GGSN) and a Local SGSN (abbreviated as L-SGSN), or can be an separate L-GGSN.

The wireless communication system as shown in FIGS. 1, 2, 3, 4 and 5 can achieve the local IP access based on a single PDN connection, and the wireless communication system as shown in FIG. 3 can also achieve the local IP access based on multi-PDN connection. Taking the Long Term Evolution (abbreviated as LTE) mobile communication network architecture for example, in the case of the local IP access based on the single PDN connection, the illustrative data streams of local IP data and core network data are shown in FIG. 6; in the case of the local IP access based on the multi-PDN connection, the illustrative data streams of local IP data and core network data are shown in FIG. 7.

At present, when the network (such as the access gateway) determines that the user data needs to be offloaded according to traffic policy, deep packet inspection policy or Quality of Service (abbreviated as QoS) policy, the mobility management entity or the terminal cannot be informed, resulting in that the data cannot be dynamically adjusted and the flexibility of establishment of the local IP connection is limited. Thus, for the establishment of the local IP connection, it needs a reasonable control method to distribute the terminal data.

SUMMARY OF THE INVENTION

The technical problem to be solved in the present invention is to provide a method and system for controlling establishment of a local IP connection, to solve the problem that, when data or application of a terminal needs to be offloaded, a mobility management entity or the terminal cannot be dynamically adjusted because it cannot be promptly informed, which results in limitation of the establishment of the local IP connection.

In order to solve the aforementioned problem, the present invention provides a method for controlling establishment of a local IP connection, and the method comprises:

when an access gateway determines that data or an application of a terminal needs to be offloaded, informing the terminal that a local IP connection needs to be established via a mobility management entity and a radio side network element by a bearer modification, or informing the radio side network element or a local gateway of a routing policy via the mobility management entity.

The method also comprises:

after the terminal is informed that the local IP connection needs to be established via the mobility management entity and the radio side network element, the terminal initiating the establishment of the local IP connection according to messages sent by the mobility management entity and the radio side network element; or, after the radio side network element or the local gateway is informed of the routing policy via the mobility management entity, the radio side network element or the local gateway acquiring that a packet data network (PDN) connection or bearer is able to perform a local IP access according to a message sent by the mobility management entity.

The access gateway determines that a certain type of data or application of the terminal needs to be offloaded by one of or a combination of following modes:

the terminal initiating a certain type of data or application, the access gateway finding out that messages of that type of data or application need to be offloaded through a deep packet inspection;

or, the access gateway finding out that load is too heavy according to traffic information, and then determining that a certain type of data or application possessed by the terminal is offloaded according to a local policy;

or, a Policy and Charging Rules Function (PCRF) informing the access gateway that a certain type of data or application needs to be offloaded and/or informing the access gateway of modified policy and charging control (PCC) rules;

or, the access gateway finding out that the mobility management entity changes.

In the step of informing the terminal that the local IP connection needs to be established via the mobility management entity and the radio side network element:

the message sent by the mobility management entity to the terminal carries a modified Traffic Flow Template (TFT), and/or an access point name (APN) or an access point name network identifier (APN-NI) that is able to establish the local IP connection, and/or a special reason value or indication which is adapt for informing the terminal to re-initiate the establishment of the PDN connection.

In the step of the terminal initiating the establishment of the local IP connection according to the message sent by the mobility management entity, a connection establishment message carries the modified TFT, and/or the APN or APN-NI that is able to establish the local IP connection, and/or the special reason value or indication.

In the step of informing the terminal that the local IP connection needs to be established via the mobility management entity and the radio side network element:

the message sent by the mobility management entity to the terminal carries a modified Traffic Flow Template (TFT) and/or a related indication of the local IP connection, wherein, the related indication is indicated by adopting one or more of following modes: a paired value, or an indication or a reason value or an identifier of the local IP connection.

In the step of the terminal initiating the establishment of the local IP connection according to the message of the mobility management entity, the message of the terminal initiating the establishment of the PDN connection to the mobility management entity via the radio side network element carries the related indication of the local IP connection, wherein, the related indication is indicated by adopting one or more of the following modes: the paired value, the indication or the reason value or the identifier of the local IP connection.

The local IP comprises one of or a combination of following connection modes: a local IP access to residential IP network, a local IP access to enterprise IP network, a local IP access to Internet, an Internet offload and a selected IP traffic offload.

The radio side network element is a base station, a Home (e)NodeB, a radio network controller (RNC), a Home (e)NodeB gateway, or a traffic offload function entity;

the mobility management entity is a mobility management element (MME), a mobile switching center (MSC), or a Serving General Packet Radio Service (GPRS) support node (SGSN);

the access gateway is a packet data network gateway (PGW) or a gateway GPSR support node (GGSN);

the local gateway is a local serving gateway (L-SGW) and a local packet data network gateway (L-PGW); or a separate L-PGW; or a local gateway GPRS support node (L-GGSN) and a Local Serving GPRS Support Node (L-SGSN); or a separate L-GGSN; or a traffic offload function entity.

Wherein, the modified traffic flow template (TFT) indicates the data or application that needs to be offloaded, or indicates to delete the data or application that needs to be offloaded, or indicates to not include the data or application that needs to be offloaded.

In order to solve the aforementioned problem, the present invention also provides a system for controlling establishment of a local IP connection, and the system comprises:

an access gateway, which is configured to: when determining that data or an application of a terminal needs to be offloaded, inform the terminal that a local IP connection needs to be established via a mobility management entity and a radio side network element by a bearer modification, or inform the radio side network element or a local gateway of a routing policy via the mobility management entity.

The system comprises:

the terminal, which is configured to: when receiving the local IP connection needing to be established informed by the access gateway via the mobility management entity and the radio side network element, initiate the establishment of the local IP connection according to messages sent by the mobility management entity and the radio side network element; and the radio side network element or the local gateway, which is configured to: when receiving the routing policy of the radio side network element or the local gateway informed by the access gateway via the mobility management entity, acquire that a packet data network (PDN) connection or bearer is able to perform a local IP access according to a message sent by the mobility management entity.

The access gateway is configured to determine that a certain type of data or application of the terminal needs to be offloaded by one of or a combination of following modes:

the terminal initiating a certain type of data or application, the access gateway finding out that messages of that type of data or application need to be offloaded through a deep packet inspection;

or, the access gateway finding out that load is too heavy according to traffic information, and then determining that a certain type of data or application possessed by the terminal is offloaded according to a local policy;

or, a Policy and Charging Rules Function (PCRF) informing the access gateway that a certain type of data or application needs to be offloaded and/or informing the access gateway of modified policy and charging control (PCC) rules;

or, the access gateway finding out that the mobility management entity changes.

The local IP comprises one of or a combination of following connection modes: a local IP access to residential IP network, a local IP access to enterprise IP network, a local IP access to Internet, an Internet offload and a selected IP traffic offload.

The radio side network element is a base station, a Home (e)NodeB, a radio network controller (RNC), a Home (e)NodeB gateway, or a traffic offload function entity;

the mobility management entity is a mobility management element (MME), a mobile switching center (MSC), or a Serving General Packet Radio Service support node (SGSN);

the access gateway is a packet data network gateway (PGW) or a gateway General Packet Radio Service support node (GGSN);

the local gateway is a local serving gateway (L-SGW) and a local packet data network gateway (L-PGW); or a separate L-PGW; or a local gateway GPRS support node (L-GGSN) and a Local Serving GPRS Support Node (L-SGSN); or a separate L-GGSN; or a traffic offload function entity.

After the access gateway determines that the data of the terminal needs to be offloaded, the present invention can promptly inform the terminal that the local IP connection needs to be established, or inform the radio side network element/the local gateway of the routing policy, so that the mobility management entity or the local gateway acquires whether the PDN connection is the local IP connection, thus the terminal can be instantly acquired whether the local IP connection needs to be re-established, and the dynamic adjustment of the local IP data can be achieved; at the same time, the present invention can achieve the dynamic adjustment of the local IP data and the dynamic establishment of the local IP connection in the case of the local IP connection.

BRIEF DESCRIPTION OF DRAWINGS

The illustration of the accompanying drawings is used to provide further understanding of the present invention, constitutes a part of the specification, and is used to explain the present invention together with the embodiments of the present invention, and does not constitute restriction of the present invention. In the accompanying drawings.

PREFERRED EMBODIMENTS OF THE PRESENT INVENTION

Figure 1:
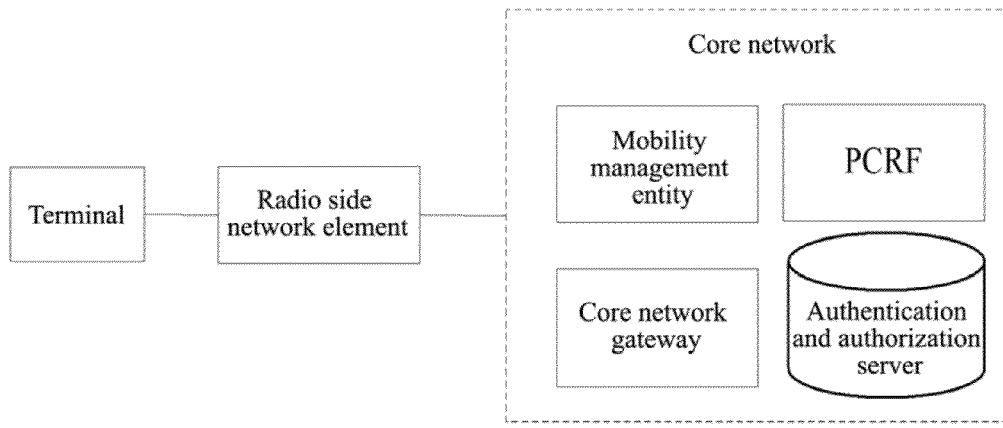
FIG. 1 is a schematic diagram one of a radio communication network connection in the related art.

To make the purpose, the technical scheme and the advantages of the present invention clearer, the technical scheme of the present invention will be further described in detail in combination with the accompanying drawings and specific embodiments, to enable those skilled in the art to better understand and implement the present invention, but the illustrated embodiments are not acted as limitation of the present invention. It should be noted that, without conflict, embodiments in the present application and characteristics in the embodiments can be combined randomly with each other.

Aiming at problems in the related art that a network side, when determining that user data needs to be offloaded according to a traffic strategy, a depth packet inspection strategy, or a QoS policy, cannot inform a mobility management entity or a terminal, resulting in that the data cannot be dynamically adjusted and the flexibility of establishment of a local IP connection is limited, the present invention proposes a method for controlling the establishment of the local IP connection. In the method, after an access gateway determines that the terminal data needs to be offloaded, it informs the terminal that a local IP connection needs to be established, or inform a radio side network element or a local gateway of a routing policy, to implement the dynamic adjustment of the local IP data and effectively improve a flexible processing mechanism of the dynamic establishment of the local IP connection.

The method for controlling establishment of a local IP connection in the present invention comprises:

when an access gateway determines that data or an application of a terminal needs to be offloaded, informing the terminal that a local IP connection needs to be established via a mobility management entity and a radio side network element by a bearer modification, or informing the radio side network element or a local gateway of a routing policy via the mobility management entity.

The method further comprises: the terminal initiating the establishment of the local IP connection according to messages sent by the mobility management entity and the radio side network element; or, the radio side network element or the local gateway acquiring that a packet data network (PDN) connection or bearer is able to perform a local IP access according to a message sent by the mobility management entity.

The access gateway determines that a certain type of data or application of the terminal needs to be offloaded by one of or a combination of following modes:

the terminal initiating a certain type of data or application, the access gateway finding out that messages of that type of data or application need to be offloaded through a deep packet inspection;

or, the access gateway finding out that load is too heavy according to traffic information, and then determining that a certain type of data or application possessed by the terminal is offloaded according to a local policy;

or, a Policy and Charging Rules Function (PCRF) informing the access gateway that a certain type of data or application needs to be offloaded and/or informing the access gateway of modified policy and charging control (PCC) rules;

or, the access gateway finding out that the mobility management entity changes.

In the step of the mobility management entity informing the terminal that the local IP connection needs to be established via the radio side network element: the message sent by the mobility management entity to the terminal carries a modified Traffic Flow Template (TFT), and/or an access point name (APN) or an access point name network identifier (APN-NI) that can establish the local IP connection, and/or a special reason value or indication which is used to informing the terminal to re-initiate the establishment of the PDN connection.

In the step of the terminal initiating the establishment of the local IP connection according to the message of the mobility management entity, a connection establishment message carries the modified TFT, and/or the APN or APN-NI that can establish the local IP connection, and/or the special reason value/indication.

In the step of the mobility management entity informing the terminal that the local IP connection needs to be established via the radio side network element:

the message sent by the mobility management entity to the terminal carries a modified Traffic Flow Template (TFT) and/or a related indication of the local IP connection, wherein, the related indication is indicated by adopting one or more of following modes: a paired value, or an indication/a reason value/an identifier of the local IP connection.

In the step of the terminal initiating the establishment of the local IP connection according to the message of the mobility management entity, the message of the terminal initiating the establishment of the PDN connection to the mobility management entity via the radio side network element carries the related indication of the local IP connection, wherein, the related indication is indicated by adopting one or more of the following modes: the paired value, the indication/reason value/identifier of the local IP connection.

The local IP comprises one of or a combination of following connection modes: a local IP access to residential IP network, a local IP access to enterprise IP network, a local IP access to Internet, an Internet offload and a selected IP traffic offload.

Further, the radio side network element can be a base station, a Home (e)NodeB, a radio network controller (RNC), a Home (e)NodeB gateway, or a traffic offload function entity.

The mobility management entity can be a mobility management entity (MME), a mobile switching center (MSC), or a Serving GPRS support node (SGSN).

The local gateway can be an L-SGW and an L-PGW, or can be a separate L-PGW, or can be an L-GGSN and an L-SGSN, or can be a separate L-GGSN, or can be a traffic offload function entity. The serving gateway can be a SGW or a SGSN. The access gateway can be a PGW or a GGSN.

Further, the local IP comprises one of or a combination of the following connection modes: a local IP access to residential IP network, a local IP access to enterprise IP network, a local IP access to Internet, an Internet offload and a selected IP traffic offload.

After the access gateway determines that the terminal data needs to be offloaded, the method for controlling the establishment of the local IP connection in the present invention can promptly informs the terminal that the local IP connection needs to be established, or informs the radio side network element or the local gateway of the routing policy, so that the mobility Management entity and the terminal timely acquire whether a local IP connection needs to be re-established, which can implement the dynamic adjustment of the local IP data, and can implement the dynamic adjustment of the local IP data and the dynamical establishment of the local IP access in the case of the local IP connection.

The application scenarios based on the E-UTRAN system are described in the following embodiments and the accompanying FIG. 8 to FIG. 11.

Figure 8:
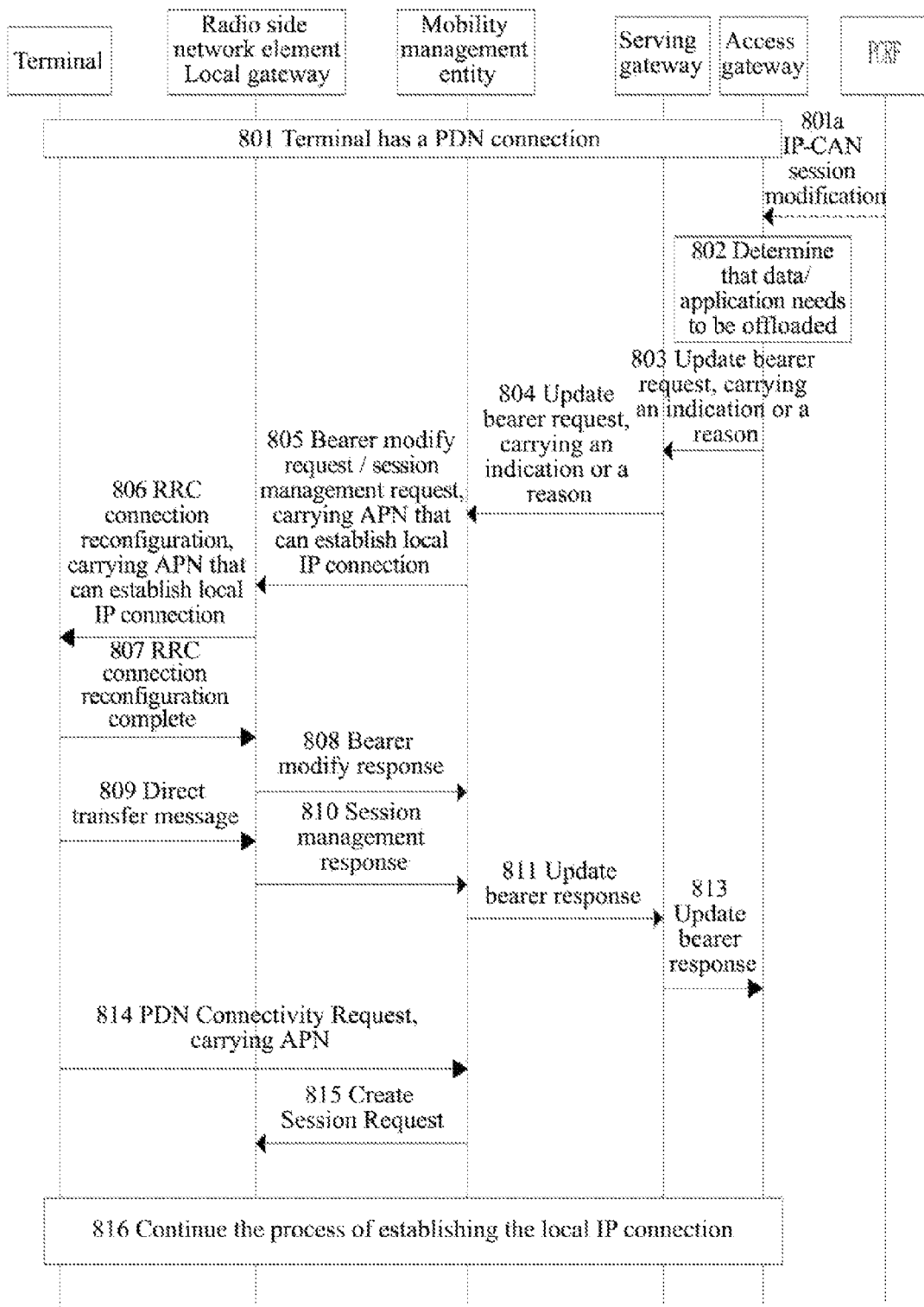
FIG. 8 is a flow chart one of an access gateway informing a terminal to re-initiate establishment of a local IP connection according to the present invention.

FIG. 8 is a flow chart of an access gateway informing a terminal to re-initiate establishment of a local IP connection, which is provided by the present invention on the basis of a system architecture shown in FIG. 3, and the specific steps are described as follows.

In step 801, the terminal has a core network PDN connection after accessing a mobile communication system.

In step 801a, optionally, a PCRF initiates an IP-Connectivity Access Network (IP-CAN) session modification to the access gateway.

In step 802, the access gateway determines that a certain type of data or application of the terminal needs to be offloaded.

The access gateway can determine that a certain type of data or application of the terminal needs to be offloaded through following methods:

the terminal initiates a certain type of data or application, the access gateway finds out that messages of such type of data or application need to be offloaded through a deep packet inspection;

or the access gateway can find out that load is too heavy according to traffic information, then it can determine that a certain type of data or application of the terminal needs to be offloaded according to a local policy;

or step 801a informs the access gateway that a certain type of data or application needs to be offloaded and/or modified policy and charging control (abbreviated as PCC) Rules;

or the access gateway finds out that the mobility management entity changes.

In step 803, the access gateway sends an update bearer request message to a serving gateway, and that message carries modified Traffic Flow Template (abbreviated as TFT), and/or an indication of the data offload or a reason of the data offload; wherein, the modified TFT can indicate the data or application that needs to be offloaded, or indicate to delete the data or application that needs to be offloaded, or indicate to not include the data or application that needs to be offloaded. That is, it can directly indicate that some data needs to be offloaded, or indicate that some data needs to be offloaded by "indicating to delete the data or application that needs to be offloaded" or "indicating to not include the data or application that needs to be offloaded".

In step 804, the serving gateway sends an update bearer request message to the mobility management entity, and that message carries the modified TFT and/or the indication of data offload or the reason of data offload; wherein, the modified TFT can indicate the data or application that needs to be offloaded, or can delete the data or application that needs to be offloaded, or do not include the data or application that needs to be offloaded.

In step 805, the mobility management entity sends a bearer modify request or a session management request to a radio side network element.

If the step 804 carries the modified TFT, and/or the indication of data offload or the reason of data offload, then the step 805 carries the modified TFT and/or an Access Point Name (abbreviated as APN) that can establish the local IP connection, or an APN-NI (Network Identifier), or a special reason value or indication which can inform the terminal to re-initiate the establishment of the PDN connection.

If the step 805 carries the special reason value or indication, the mobility management entity can set a local IP connection establishment waiting timer after sending the message.

In step 806, the radio side network element sends a radio resource control (abbreviated as RRC) connection reconfiguration to the terminal, and that carries the modified TFT and/or the APN that can establish the local IP connection, or the APN-NI, or the special reason value or indication which can inform the terminal to re-initiate the establishment of the PDN connection.

In step 807, the terminal replies RRC connection reconfiguration complete to the radio side network element.

In step 808, the radio side network element replies a bearer modify response to the mobility management entity.

In step 809, the terminal sends a direct transfer message to the radio side network element.

In step 810, the radio side network element replies a session management response message to the mobility management entity.

In step 811, the mobility management entity replies an update bearer response to the serving gateway.

In step 813, the serving gateway replies an update bearer response to the access gateway.

In step 814, according to the modified TFT, and/or the APN, or the APN-NI, or the special reason value or indication carried in the message of step 806, the terminal initiates the establishment of the PDN connection to the mobility management entity via the radio side network element.

If the step 806 carries the APN or the APN-NI, the message sent to the mobility management entity in the step 814 carries that APN or APN-NI.

If the step 806 carries the modified TFT, or the special reason value or indication, the mobility management entity, after receiving a first PDN establishment request initiated by the terminal within the local IP connection establishment waiting timer, considers that the local IP connection needs to be established; or if the step 806 carries the modified TFT, or the special reason value or indication, the message sent to the mobility management entity in the step 814 carries the indication or reason value or identifier of the local IP connection.

The step 814 can be executed after the step 806.

In step 815, the mobility management entity selects a local gateway to establish the local IP connection and sends a Create Session Request message.

The mobility management entity can acquire the local gateway information according to the APN or the APN-NI carried in the step 814, or after determining that the local IP connection needs to be established, can acquire the local gateway information sent by the radio side network element to the mobility management entity in the step 814 to establish the local IP connection.

In step 816, the process of establishing the PDN connection is continued.

Figure 9:
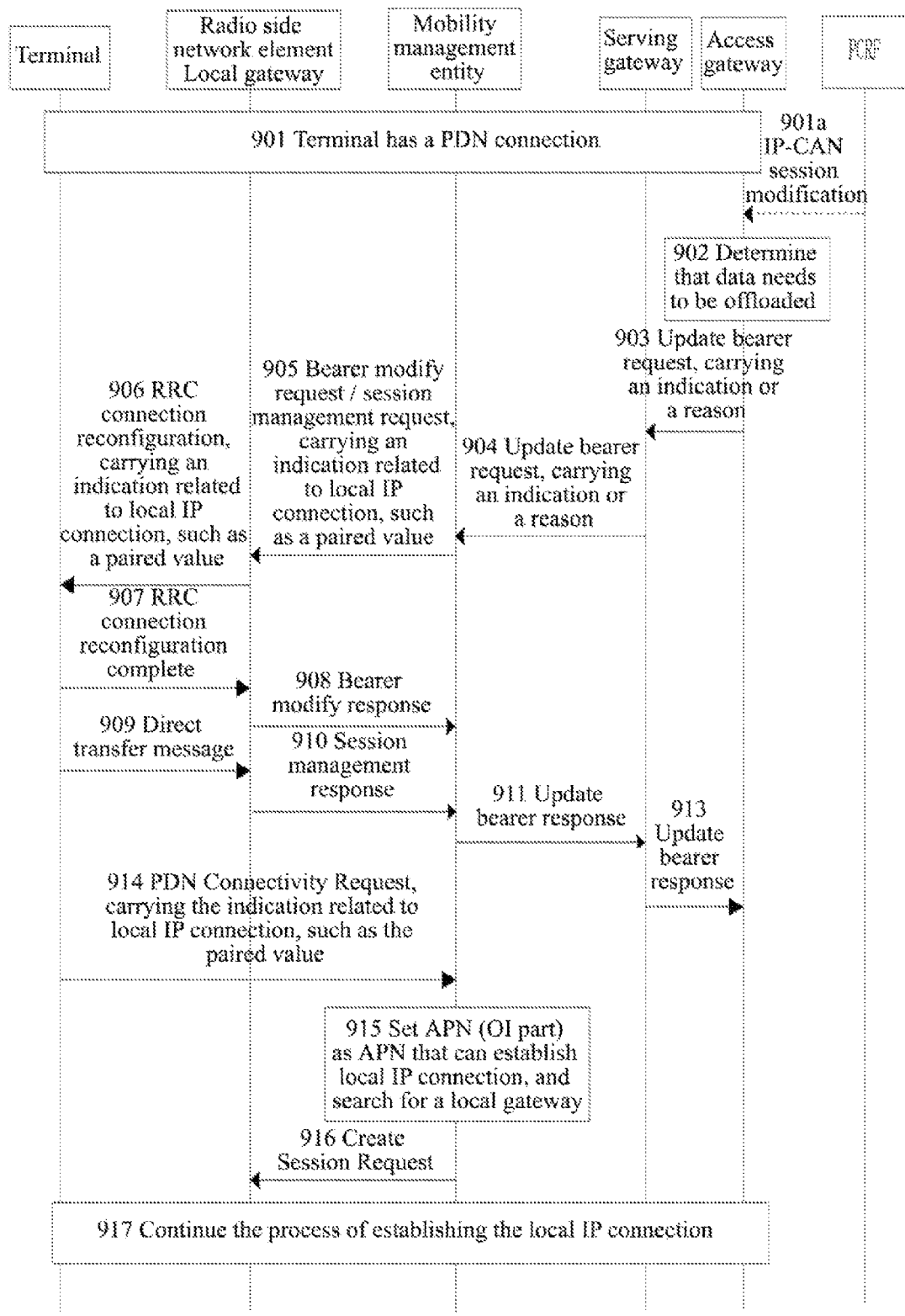
FIG. 9 is a flow chart two of an access gateway informing a terminal to re-initiate establishment of a local IP connection according to the present invention.

FIG. 9 is a flow chart of an access gateway notifying a terminal to re-initiate establishment of a local IP connection, which provided by the present invention on the basis of a system architecture shown in FIG. 3, and the specific steps are described as follows.

In step 901, the terminal has a core network PDN connection after accessing a mobile communication system.

In step 901a, optionally, a PCRF initiates an IP-CAN session modification to the access gateway.

In step 902, the access gateway determines that a certain type of data or application of the terminal needs to be offloaded.

The access gateway can determine that a certain type of data or application of the terminal needs to be offloaded through following methods:
  the terminal initiates a certain type of data or application, the access gateway finds out that messages of such type of data or application need to be offloaded through a deep packet inspection;
  or the access gateway can find out that load is too heavy according to traffic information, then it can determine that a certain type of data or application of the terminal needs to be offloaded according to a local policy;
  or step 801a informs the access gateway that a certain type of data or application needs to be offloaded and/or modified PCC Rules;
  or the access gateway finds out that the mobility management entity changes.

In step 903, the access gateway sends an update bearer request message to a serving gateway, and that message carries modified TFT, and/or an indication of the data offload or a reason of the data offload; wherein, the modified TFT can indicate the data or application that needs to be offloaded, or indicate to delete the data or application that needs to be offloaded, or indicate to not include the data or application that needs to be offloaded.

In step 904, the serving gateway sends an update bearer request message to the mobility management entity, and that message carries the modified TFT and/or the indication of data offload or the reason of data offload; wherein, the modified TFT can indicate the data or application that needs to be offloaded, or indicate to delete the data or application that needs to be offloaded, or indicate to not include the data or application that needs to be offloaded.

In step 905, the mobility management entity sends a bearer modify request or a session management request to a radio side network element.

If the step 904 carries the modified TFT, and/or the indication of data offload or reason of data offload, then the step 905 carries the modified TFT and/or a related indication of the local IP connection, such as a paired value, or an indication or reason value or identifier of the local IP connection.

In step 906, the radio side network element sends an RRC connection reconfiguration to the terminal, and the message carries the modified TFT and/or the related indication of the local IP connection, such as the paired value, or the indication or reason value or identifier of the local IP connection.

In step 907, the terminal replies RRC connection reconfiguration complete to the radio side network element.

In step 908, the radio side network element replies a bearer modify response to the mobility management entity.

In step 909, the terminal sends a direct transfer message to the radio side network element.

In step 910, the radio side network element replies a session management response message to the mobility management entity.

In step 911, the mobility management entity replies an update bearer response to the serving gateway.

In step 913, the serving gateway replies an update bearer response to the access gateway.

In step 914, according to the message in the step 906, the terminal initiates the establishment of the PDN connection to the mobility management entity via the radio side network element.

If the step 906 carries the related indication of the local IP connection, such as the paired value, or the indication or reason value or identifier of the local IP connection, the message sent to the mobility management entity in the step 914 carries the related indication of the local IP connection.

The step 914 can be executed after the step 906.

In step 915, the mobility management entity sets the APN Operator Identifier (OI) part as APN-OI that can establish the local IP connection, and selects a local gateway to establish the local IP connection.

The mobility management entity can acquire the local gateway information according to the modified APN in the step 915, or can acquire the local gateway information sent by the radio side network element to the mobility management entity in the step 914 to establish the local IP connection after determining that the local IP connection needs to be established.

In step 916, the mobility management entity sends a Create Session Request message.

In step 917, the process of establishing the PDN connection is continued.

Figure 10:
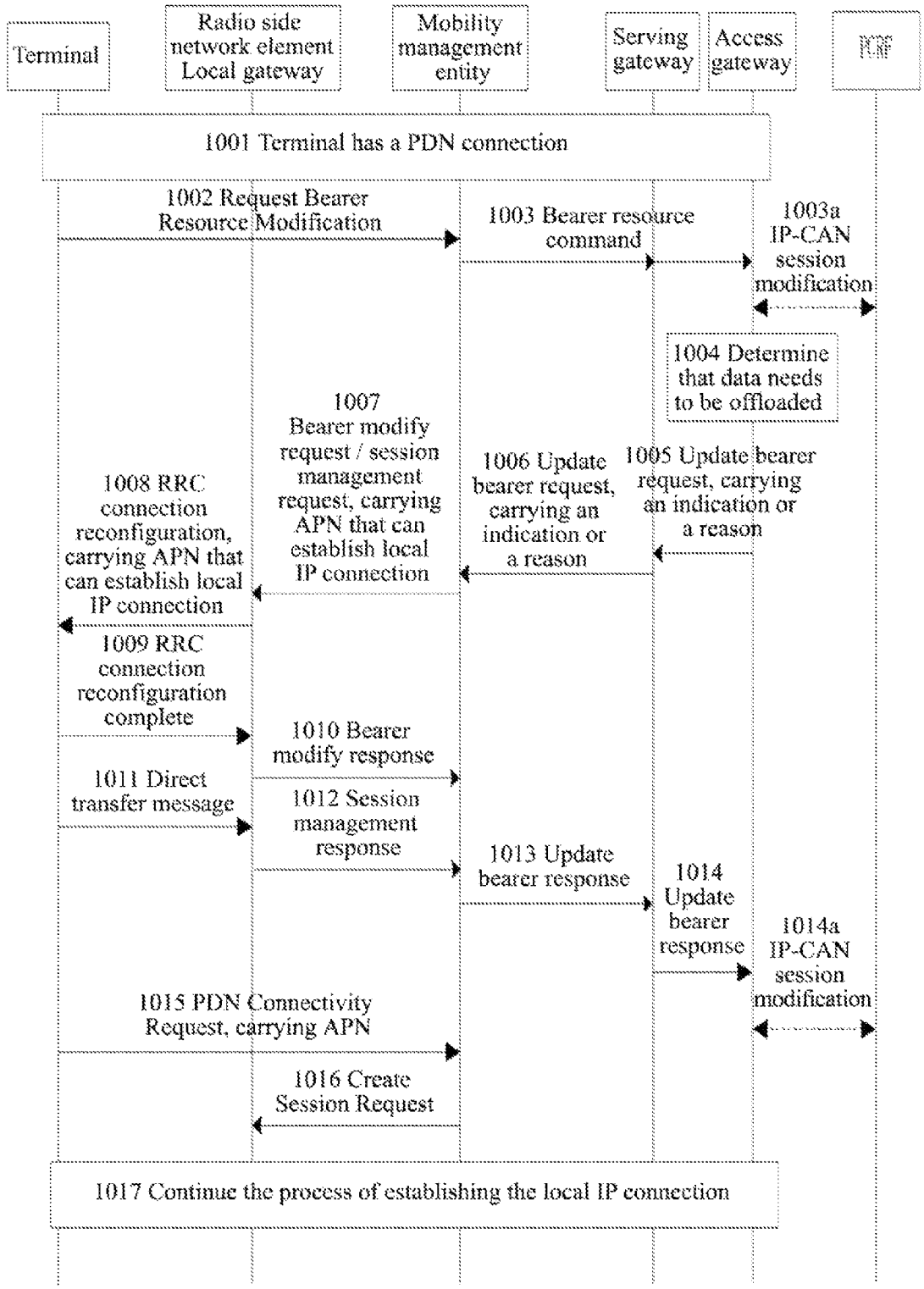
FIG. 10 is a flow chart three of an access gateway informing a terminal to re-initiate establishment of a local IP connection according to the present invention.

FIG. 10 is a flow chart of an access gateway informing a terminal to re-initiate establishment of a local IP connection, which is provided by the present invention on the basis of a system architecture shown in FIG. 3, and the specific steps are described as follows.

In step 1001, the terminal has a core network PDN connection after accessing a mobile communication system.

In step 1002, the terminal sends a Request Bearer Resource Modification message to a mobility management entity via a radio side network element.

In step 1003, the mobility management entity sends a bearer resource command message to a serving gateway, and the serving gateway sends the bearer resource command message to the access gateway.

In step 1003a, optionally, the access gateway interacts with the PCRF to start to execute an IP-CAN session Modification.

In step 1004, the access gateway determines that a certain type of data or application of the terminal needs to be offloaded by PCC rules sent in step 1003a or a local policy.

In step 1005, the access gateway sends an update bearer request message to the serving gateway, and that message carries a modified TFT and/or an indication of data offload or a reason of data offload, wherein, the modified TFT can indicate the data or application that needs to be offloaded, or can indicate to delete the data or application that needs to be offloaded, or can indicate to not include the data or application that needs to be offloaded.

In step 1006, the serving gateway sends an update bearer request message to the mobility management entity, and that message carries the modified TFT and/or the indication of data offload or the reason of data offload, wherein, the modified TFT can indicate the data or application that needs to be offloaded, or indicate to delete the data or application that needs to be offloaded, or indicate to not include the data/application that needs to be offloaded.

In step 1007, the mobility management entity sends a bearer modify request or a session management request to the radio side network element.

If the step 1006 carries the modified TFT, and/or the indication of data offload or the reason of data offload, then the step 1007 carries the modified TFT and/or an APN that can establish the local IP connection, or an APN-NI, or a special reason value or indication which can inform the terminal to re-initiate the establishment of the PDN connection.

If the step 1007 carries the special reason value or indication, the mobility management entity can set a local IP connection establishment waiting timer after sending the message.

In step 1008, the radio side network element sends a RRC connection reconfiguration to the terminal, and that carries the modified TFT and/or the APN that can establish the local IP connection, or the APN-NI, or the special reason value or indication which can inform the terminal to re-initiate the establishment of the PDN connection.

In step 1009, the terminal replies RRC connection reconfiguration complete to the radio side network element.

In step 1010, the radio side network element replies a bearer modify response to the mobility management entity.

In step 1011, the terminal sends a direct transfer message to the radio side network element.

In step 1012, the radio side network element replies a session management response message to the mobility management entity.

In step 1013, the mobility management entity replies an update bearer response to the serving gateway.

In step 1014, the serving gateway replies an update bearer response to the access gateway.

In step 1014a, optionally, an access network informs the PCRF of a policy execution result, and the IP-CAN session Modification ends.

In step 1015, according to the modified TFT, and/or the APN, or the APN-NI, or the special reason value or indication carried in the message of the step 1008, the terminal initiates the establishment of the PDN connection to the mobility management entity via the radio side network element.

If the step 1008 carries the APN or the APN-NI, the message sent to the mobility management entity in the step 1015 carries that APN or APN-NI.

If the step 1008 carries the modified TFT, and/or the special reason value or indication, the mobility management entity, after receiving a first PDN establishment request initiated by the terminal within the local IP connection establishment waiting timer, considers that the local IP connection needs to be established; or if the step 1008 carries the modified TFT, and/or the special reason value or indication, the message sent to the mobility management entity in the step 1015 carries the indication or reason value or identifier of the local IP connection.

The step 1015 can be executed after the step 1008.

In step 1016, the mobility management entity selects a local gateway to establish the local IP connection and sends a Create Session Request message.

The mobility management entity can acquire the local gateway information according to the APN or the APN-NI carried in the step 1015, or after determining that the local IP connection needs to be established, can also acquire the local gateway information sent by the radio side network element to the mobility management entity in the step 1015 to establish the local IP connection.

In step 1017, the process of establishing the PDN connection is continued.

To simplify the description, the above embodiments only take the cases that the bearer modify request or the session management request sent by the mobility management entity to the radio side network element carries the APN that can establish the local IP connection, or the APN-NI, or the special reason value or indication for example, to illustrate the method for controlling the establishment of the local IP connection. The mode shown in FIG. 9 can also be used, that is, the bearer modify request or the session management request sent by the mobility management entity to the radio side network element carries the related indication of the local IP connection, such as the paired value, or the indication or reason value or identifier of the local IP connection. In this case, the message in the steps 1008 and 1015 carries the related indication of the local IP connection; in addition, the other processes for controlling the establishment of the local IP connection are similar to the aforementioned embodiments and will not impact on the elaboration of the present invention, thus they are not described repeatedly herein.

Figure 3:
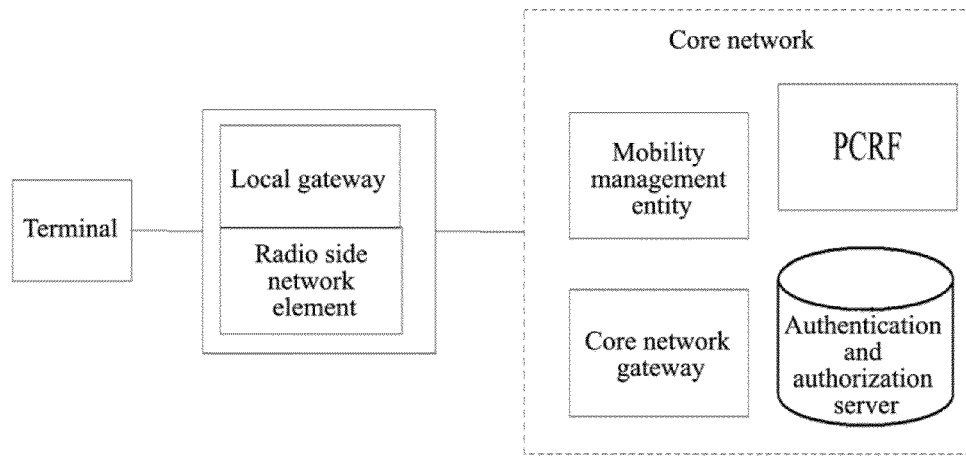
FIG. 3 is a schematic diagram three of a radio communication network connection in the related art.
Figure 4:
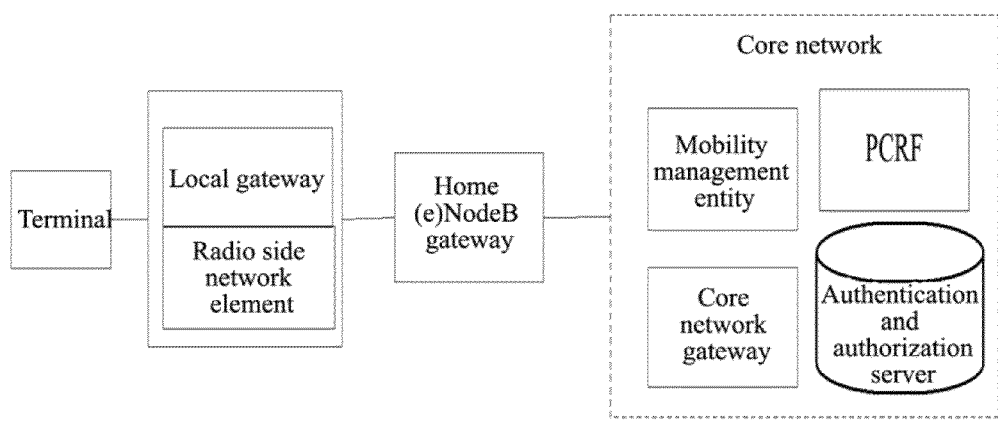
FIG. 4 is a schematic diagram four of a radio communication network connection in the related art.
Figure 5:
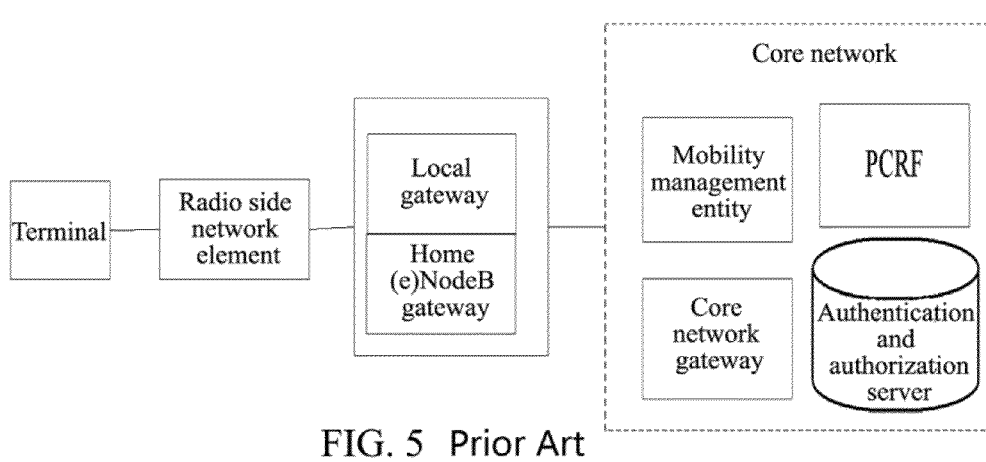
FIG. 5 is a schematic diagram five of a radio communication network connection in the related art.
Figure 6:
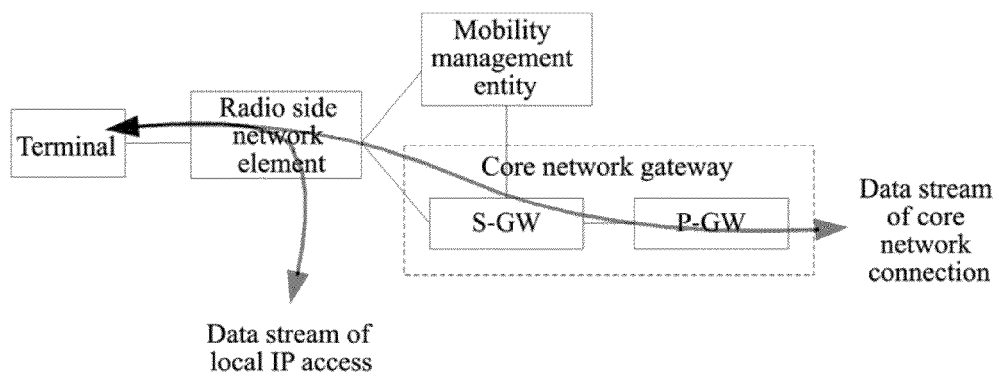
FIG. 6 is a schematic diagram one of local IP access data stream in a mobile communication system in the related art.
Figure 7:
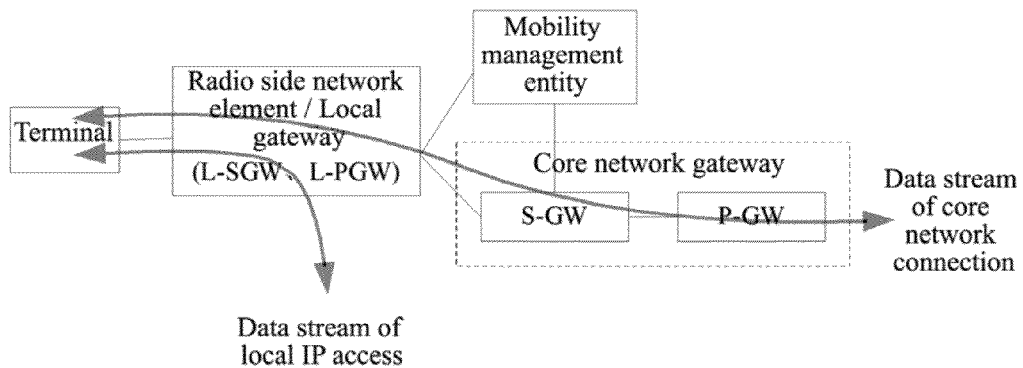
FIG. 7 is a schematic diagram two of local IP access data stream in a mobile communication system in the related art.

To simplify the description, the above embodiments only take the case of FIG. 3 for example to illustrate the management method for the local IP connection. In the case of the systems shown in FIG. 4 and FIG. 5, the method for controlling the establishment of the local IP connection is very similar to the above embodiments and will not impact on the elaboration of the present invention, thus it will not be described repeatedly herein.

Figure 11:
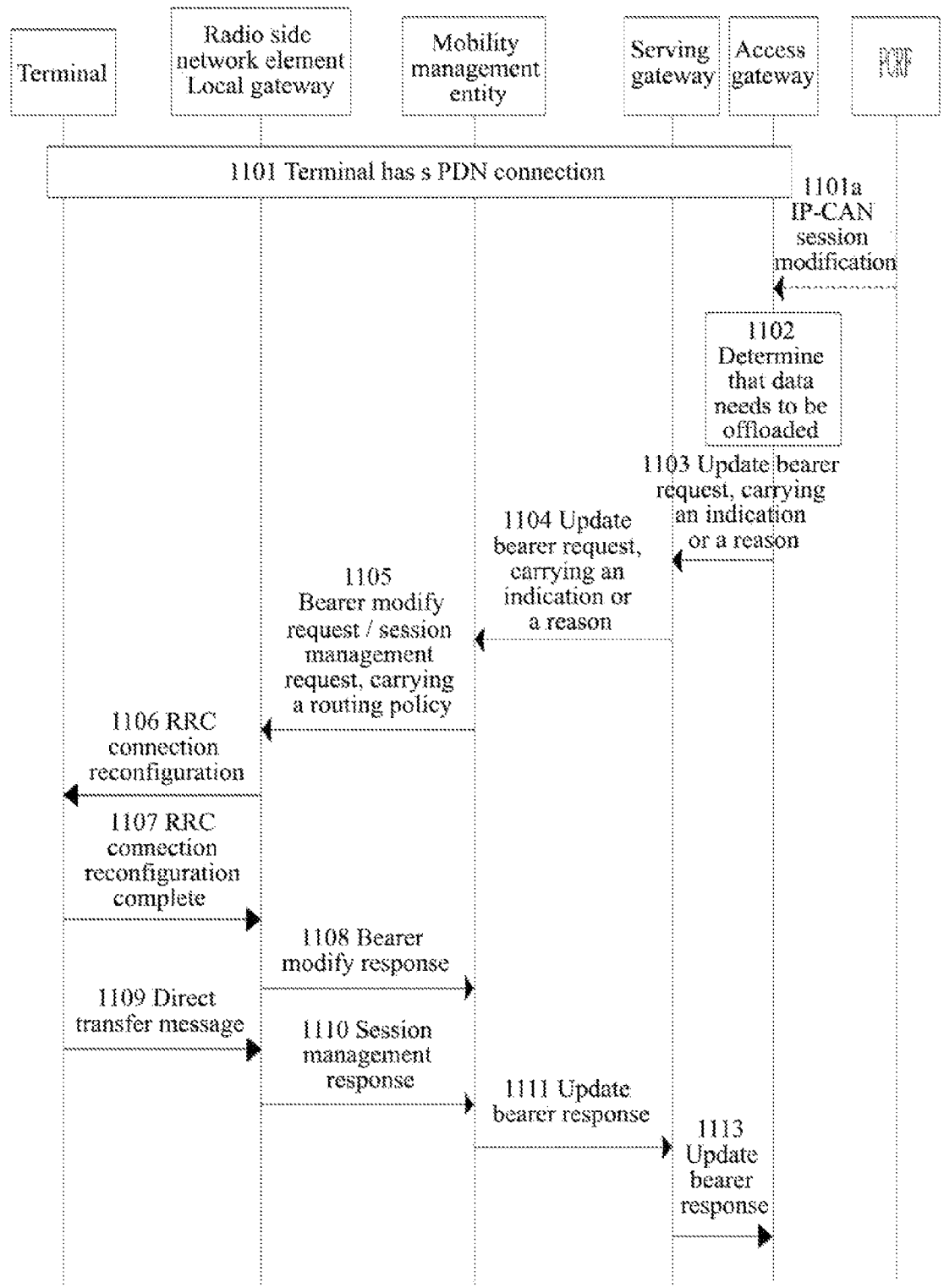
FIG. 11 is a flow chart four of an access gateway informing a terminal to re-initiate establishment of a local IP connection according to the present invention.

FIG. 11 is a flow chart of an access gateway notifying a radio side network element or a local gateway that a PDN connection can perform a local IP access, which is provided in the present invention on the basis of a system architecture shown in FIG. 1 or FIG. 3, and the specific steps are described as follows.

In step 1101, the terminal has a core network PDN connection after accessing a mobile communication system.

In step 1101a, optionally, a PCRF initiates an IP-CAN session modification to the access gateway.

In step 1102, the access gateway determines that a certain type of data or application of the terminal needs to be offloaded.

The access gateway can determine that a certain type of data or application of the terminal needs to be offloaded through following methods:

the terminal initiates a certain type of data or application, the access gateway finds out that messages of such type of data or application need to be offloaded through a deep packet inspection;

or the access gateway can find out that load is too heavy according to traffic information, then it can determine that a certain type of data or application of the terminal needs to be offloaded according to a local policy;

or step 801a informs the access gateway that a certain type of data or application needs to be offloaded and/or modified PCC Rules;

or, in the case that the terminal initiates a bearer resource modification (after the terminal sends a Request Bearer Resource Modification message to the mobility management entity via the radio side network element, the mobility management entity sends a bearer resource command to the access gateway via a serving gateway), the access gateway determines that a certain type of data/application of the terminal needs to be offloaded via the PCC rules sent by the PCRF or the local policy;

or the access gateway finds out that the mobility management entity changes.

In step 1103, the access gateway sends an update bearer request message to the serving gateway, and that message carries modified routing policy, and/or modified TFT, and/or an indication of the data offload or a reason of the data offload; wherein, the modified TFT can indicate the data or application that needs to be offloaded, or indicate to delete the data or application that needs to be offloaded, or indicate to not include the data or application that needs to be offloaded.

In step 1104, the serving gateway sends an update bearer request message to the mobility management entity, and that message carries the modified routing policy, and/or the modified TFT and/or the indication of data offload or the reason of data offload; wherein, the modified TFT can indicate the data or application that needs to be offloaded, or indicate to delete the data or application that needs to be offloaded, or indicate to not include the data or application that needs to be offloaded.

In step 1105, the mobility management entity sends a bearer modify request or a session management request to the radio side network element or the local gateway.

If the step 1104 carries the modified routing policy, and/or the modified TFT, and/or the indication of data offload or reason of data offload, then the step 1105 carries the routing policy, and/or the modified TFT, and/or the special reason value or indication that can inform the radio side network element or the local gateway that the PDN connection or bearer can perform the local IP access. Wherein, the routing policy carried in the step 1105 can be the routing policy carried in the step 1104, or the routing policy modified by the mobility management entity in step 1105.

In step 1106, the radio side network element sends a RRC connection reconfiguration to the terminal, and the RRC connection reconfiguration carries the modified TFT, and/or the special reason value or indication which can inform the terminal that the PDN connection can perform the local IP access.

In step 1107, the terminal replies the RRC connection reconfiguration complete to the radio side network element.

In step 1108, the radio side network element replies a bearer modify response to the mobility management entity.

In step 1109, the terminal sends a direct transfer message to the radio side network element.

In step 1110, the radio side network element replies a session management response message to the mobility management entity.

In step 1111, the mobility management entity replies an update bearer response to the serving gateway.

In step 1113, the serving gateway replies the update bearer response to the access gateway.

The information of the local gateway, the radio side network element and the serving gateway can be a combination of one or more of: ID, identifier and address.

Figure 2:
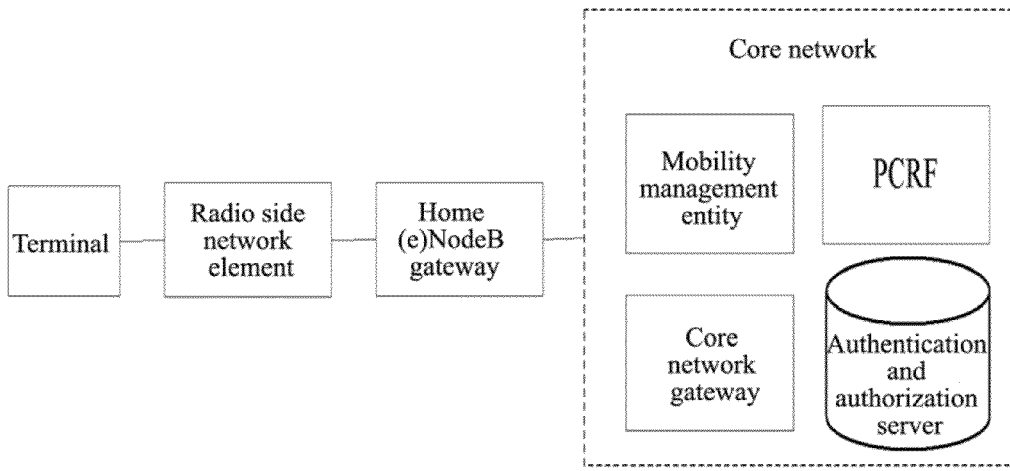
FIG. 2 is a schematic diagram two of a radio communication network connection in the related art.

To simplify the description, the above embodiment only takes the case of FIG. 1 or FIG. 3 for example to illustrate the management method for the local IP connection. In the case of the systems shown in FIG. 2, FIG. 4 and FIG. 5, the method for controlling the establishment of the local IP connection is very similar to the above embodiment and will not impact on the elaboration of the present invention, thus it will not be described repeatedly herein.

To simplify the description, the above embodiments only take the case of E-UTRAN for example to illustrate the management method for the local IP connection. In the case of the UTRAN system, the method for controlling the establishment of the local IP connection is very similar to the aforementioned embodiment and will not impact on the elaboration of the present invention, thus it will not be described repeatedly herein.

In the aforementioned embodiments:

The radio side network element can be the base station, the Home (e)NodeB, the RNC, the Home (e)NodeB gateway, or the traffic offload function entity.

The mobility management entity can be the Mobility Management Entity (abbreviated as MME), the MSC or the SGSN.

The local gateway can be the L-SGW and the L-PGW, can be a separate L-PGW, can be the L-GGSN and the L-SGSN, can be a separate L-GGSN, and can be the traffic offload function entity.

The serving gateway can be the SGW or the SGSN.

The access gateway can be the PGW or the GGSN.

The radio side network element of the local IP connection can be the same as the local gateway address.

The local IP can be a local IP access to residential IP network, a local IP access to enterprise IP network, a local IP access to Internet, an Internet offload and a selected IP traffic offload.

The location update can be the tracking area update or the routing area update.

The present embodiment also provides a system for controlling establishment of a local IP connection, and the system comprises:

an access gateway, which is configured to: when determining that data or an application of a terminal needs to be offloaded, inform the terminal that a local IP connection needs to be established via a mobility management entity and a radio side network element by a bearer modification, or inform the radio side network element or a local gateway of a routing policy via the mobility management entity.

The system also comprises:

the terminal, which is configured to: when receiving the local IP connection needing to be established informed by the access gateway via the mobility management entity and the radio side network element, initiate the establishment of the local IP connection according to messages sent by the mobility management entity and the radio side network element; and the radio side network element or the local gateway, which is configured to: when receiving the routing policy of the radio side network element or the local gateway informed by the access gateway via the mobility management entity, acquire that a packet data network (PDN) connection or bearer is able to perform a local IP access according to a message sent by the mobility management entity.

The access gateway is configured to determine that a certain type of data or application of the terminal needs to be offloaded by one of or a combination of following modes:

the terminal initiating a certain type of data or application, the access gateway finding out that messages of that type of data or application need to be offloaded through a deep packet inspection;

or, the access gateway finding out that load is too heavy according to traffic information, and then determining that a certain type of data or application possessed by the terminal is offloaded according to a local policy;

or, a Policy and Charging Rules Function (PCRF) informing the access gateway that a certain type of data or application needs to be offloaded and/or informing the access gateway of modified policy and charging control (PCC) rules;

or, the access gateway finding out that the mobility management entity changes.

The local IP comprises one of or a combination of following connection modes: a local IP access to residential IP network, a local IP access to enterprise IP network, a local IP access to Internet, an Internet offload and a selected IP traffic offload.

Wherein, the radio side network element is a base station, a Home (e)NodeB, a radio network controller (RNC), a Home (e)NodeB gateway, or a traffic offload function entity;

the mobility management entity is a mobility management element (MME), a mobile switching center (MSC), or a Serving General Packet Radio Service support node (SGSN);

the access gateway is a packet data network gateway (PGW) or a gateway General Packet Radio Service support node (GGSN);

the local gateway is a local serving gateway (L-SGW) and a local packet data network gateway (L-PGW); or a separate L-PGW; or a local gateway GPRS support node (L-GGSN) and a Local Serving GPRS Support Node (L-SGSN); or a separate L-GGSN; or a traffic offload function entity.

The above description is only the preferred embodiments of the present invention and is not intended to limit the present invention; and for those skilled in the art, the present invention can have a variety of modifications and changes. Obviously, those skilled in the art should understand that, each above module or each above step of the present invention can be achieved with the general-purpose computing device, and the modules or steps can be integrated in a single computing device, or offloaded to a network composed of multiple computing devices; optionally, they can be implemented with program codes executable by the computing device, thus, they can be stored in a storage device to be executed by the computing device, or they are made into separate integrated circuit modules respectively, or some modules or steps of them can be implemented as a single integrated circuit module. Thus, the present invention is not limited to any particular combination of hardware and software. Within the spirit and principle of the present invention, any modification, equivalent replacement or improvement made should be included within the protection scope of the present invention.

INDUSTRIAL APPLICABILITY

After the access gateway determines that the data of the terminal needs to be offloaded, the present invention can promptly inform the terminal that the local IP connection needs to be established, or inform the radio side network element/the local gateway of the routing policy, so that the mobility management entity or the local gateway acquires whether the PDN connection is the local IP connection, thus the terminal can be instantly acquired whether the local IP connection needs to be re-established, and the dynamic adjustment of the local IP data can be achieved; at the same time, the present invention can achieve the dynamic adjustment of the local IP data and the dynamic establishment of the local IP connection in the case of the local IP connection.

What is claimed is:

1. A method for controlling establishment of a local IP access, comprising:

when an access gateway determines a type of data or an application of a terminal needs to be offloaded, informing the terminal that a local IP connection needs to be established via a mobility management entity and a radio side network element by a bearer modification, or informing a radio side network element or a local gateway of a routing policy via a mobility management entity; wherein, the radio side network element is a base station, a Home (e)NodeB, a radio network controller (RNC), a Home (e)NodeB gateway, or a traffic offload function entity;

the mobility management entity is a mobility management element (MME), a mobile switching center (MSC), or a Serving General Packet Radio Service (GPRS) support node (SGSN);

the access gateway is a packet data network gateway (PGW) or a gateway GPSR support node (GGSN);

the local gateway is a local serving gateway (L-SGW) and a local packet data network gateway (L-PGW); or a separate L-PGW; or a local gateway GPRS support node (L-GGSN) and a Local Serving GPRS Support Node (L-SGSN); or a separate L-GGSN; or a traffic offload function entity.

2. The method of claim 1, wherein, further comprising:
after the terminal is informed that the local IP connection needs to be established via the mobility management entity and the radio side network element, the terminal initiating a establishment of the local IP connection according to messages sent by the mobility management entity and the radio side network element; or, after the radio side network element or the local gateway is informed of the routing policy via the mobility management entity, the radio side network element or the local gateway acquiring that a packet data network (PDN) connection or bearer is able to perform a local IP access according to a message sent by the mobility management entity.

3. The method of claim 1, wherein, the access gateway determines that a type of data or application of the terminal needs to be offloaded by one of or a combination of following modes:

the terminal initiating a type of data or application, the access gateway finding out messages of said type of data or application need to be offloaded through a deep packet inspection;

or, the access gateway finding out that load of the access gateway is too heavy according to traffic information, and then determining that a type of data or application possessed by the terminal is offloaded according to a local policy;

or, a Policy and Charging Rules Function (PCRF) informing the access gateway that a type of data or application needs to be offloaded and/or informing the access gateway of modified policy and charging control (PCC) rules;

or, the access gateway finding out that the mobility management entity changes.

4. The method of claim 2, wherein, in the step of informing the terminal that the local IP connection needs to be established via the mobility management entity and the radio side network element:

the message sent by the mobility management entity to the terminal carries a modified Traffic Flow Template (TFT), and/or an access point name (APN) or an access point name network identifier (APN-NI) that is able to establish the local IP connection, and/or a special reason value or indication which is adapt for informing the terminal to re-initiate the establishment of the PDN connection.

5. The method of claim 4, wherein,
in the step of the terminal initiating the establishment of the local IP connection according to the message sent by the mobility management entity, a connection establishment message carries the modified TFT, and/or the APN or APN-NI that is able to establish the local IP connection, and/or the special reason value or indication.

6. The method of claim 2, wherein, in the step of informing the terminal that the local IP connection needs to be established via the mobility management entity and the radio side network element:

the message sent by the mobility management entity to the terminal carries a modified Traffic Flow Template (TFT) and/or a related indication of the local IP connection, wherein, the related indication is indicated by adopting one or more of following modes: a paired value, or an indication or a reason value or an identifier of the local IP connection.

7. The method of claim 6, wherein,
in the step of the terminal initiating the establishment of the local IP connection according to the message of the mobility management entity, the message of the terminal initiating the establishment of the PDN connection to the mobility management entity via the radio side network element carries the related indication of the local IP connection, wherein, the related indication is indicated by adopting one or more of the following modes: the paired value, the indication or the reason value or the identifier of the local IP connection.

8. The method of claim 1, wherein, the local IP comprises one of or a combination of following connection modes: a local IP access to residential IP network, a local IP access to enterprise IP network, a local IP access to Internet, an Internet offload and a selected IP traffic offload.

9. The method of claim 4, wherein,
the modified traffic flow template (TFT) indicates the data or application that needs to be offloaded, or indicates to delete the data or application that needs to be offloaded, or indicates to not include the data or application that needs to be offloaded.

10. A system for controlling establishment of a local IP connection, comprising:

an access gateway, which is configured to: when determining a type of data or an application of a terminal needs to be offloaded, inform the terminal that a local IP connection needs to be established via a mobility management entity and a radio side network element by a bearer modification, or inform a radio side network element or a local gateway of a routing policy via a mobility management entity; wherein, the radio side network element is a base station, a Home (e)NodeB, a radio network controller (RNC), a Home (e)NodeB gateway, or a traffic offload function entity;

the mobility management entity is a mobility management element (MME), a mobile switching center (MSC), or a Serving General Packet Radio Service support node (SGSN);

the access gateway is a packet data network gateway (PGW) or a gateway General Packet Radio Service support node (GGSN);

the local gateway is a local serving gateway (L-SGW) and a local packet data network gateway (L-PGW); or a separate L-PGW; or a local gateway GPRS support node (L-GGSN) and a Local Serving GPRS Support Node (L-SGSN); or a separate L-GGSN; or a traffic offload function entity.

11. The system of claim 10, further comprising:
the terminal, which is configured to: when receiving the local IP connection needing to be established informed by the access gateway via the mobility management entity and the radio side network element, initiate a establishment of the local IP connection according to messages sent by the mobility management entity and the radio side network element; and the radio side network element or the local gateway, which is configured to: when receiving the routing policy of the radio side network element or the local gateway informed by the access gateway via the mobility management entity, acquire that a packet data network (PDN) connection or bearer is able to perform a local IP access according to a message sent by the mobility management entity.

12. The system of claim 10, wherein, the access gateway is configured to determine that a type of data or application of the terminal needs to be offloaded by one of or a combination of following modes:

the terminal initiating a type of data or application, the access gateway finding out messages of said type of data or application need to be offloaded through a deep packet inspection;

or, the access gateway finding out that load is too heavy according to traffic information, and then determining that a type of data or application possessed by the terminal is offloaded according to a local policy;

or, a Policy and Charging Rules Function (PCRF) informing the access gateway that a type of data or application needs to be offloaded and/or informing the access gateway of modified policy and charging control (PCC) rules;

or, the access gateway finding out that the mobility management entity changes.

13. The system of claim 10, wherein, the local IP comprises one of or a combination of following connection modes: a local IP access to residential IP network, a local IP access to enterprise IP network, a local IP access to Internet, an Internet offload and a selected IP traffic offload.

14. The method of claim 2, wherein, the local IP comprises one of or a combination of following connection modes: a local IP access to residential IP network, a local IP access to enterprise IP network, a local IP access to Internet, an Internet offload and a selected IP traffic offload.

15. The method of claim 3, wherein, the local IP comprises one of or a combination of following connection modes: a local IP access to residential IP network, a local IP access to enterprise IP network, a local IP access to Internet, an Internet offload and a selected IP traffic offload.

16. The method of claim 4, wherein, the local IP comprises one of or a combination of following connection modes: a local IP access to residential IP network, a local IP access to enterprise IP network, a local IP access to Internet, an Internet offload and a selected IP traffic offload.

17. The method of claim 5, wherein,
the modified traffic flow template (TFT) indicates the data or application that needs to be offloaded, or indicates to delete the data or application that needs to be offloaded, or indicates to not include the data or application that needs to be offloaded.

18. The method of claim 6, wherein,
the modified traffic flow template (TFT) indicates the data or application that needs to be offloaded, or indicates to delete the data or application that needs to be offloaded, or indicates to not include the data or application that needs to be offloaded.

* * * * *